Aug. 23, 1949.                L. BOYLAN                2,479,719
                           ROCK PICKING MACHINE
Filed Jan. 2, 1948                              3 Sheets-Sheet 1
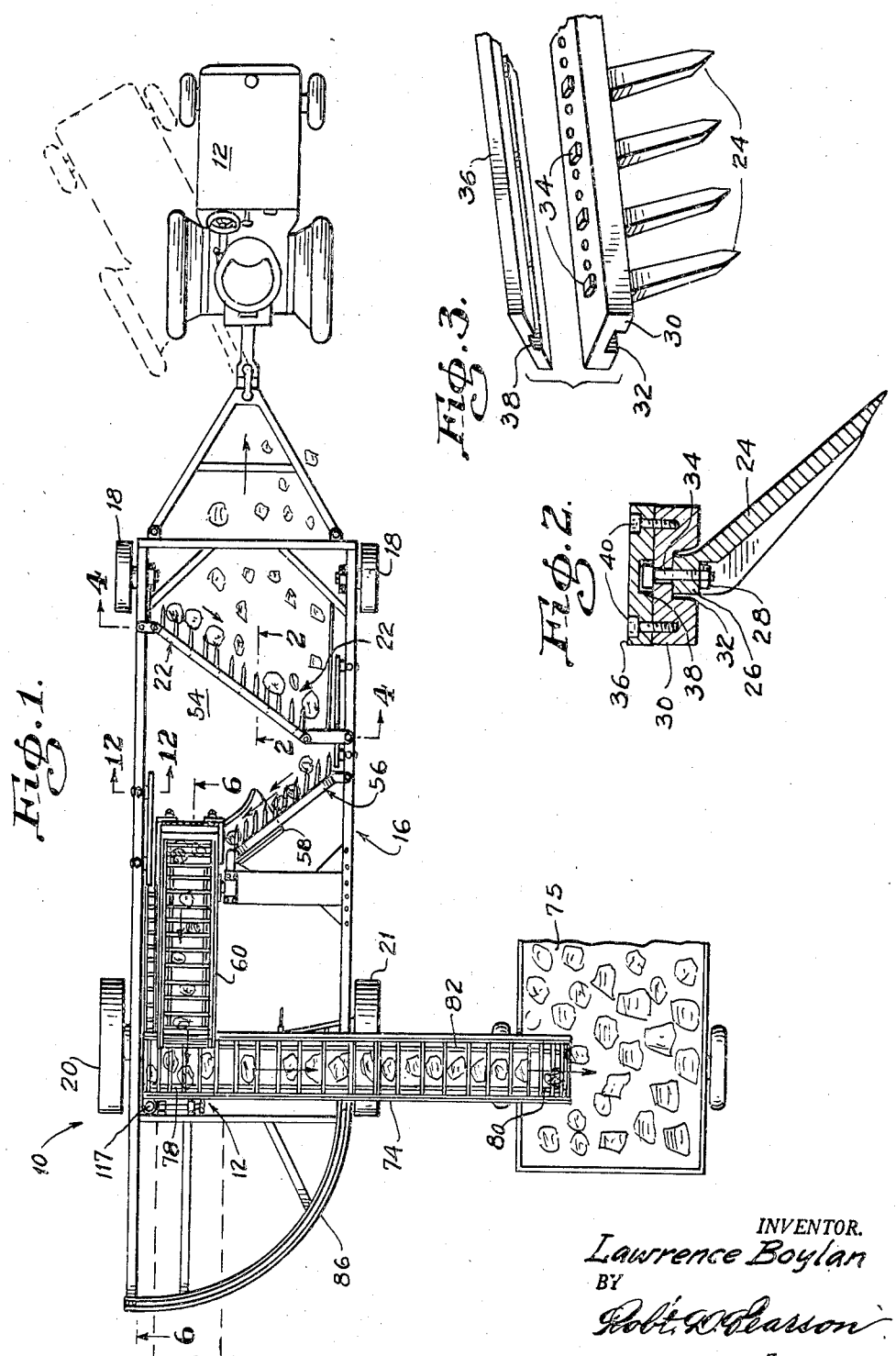
INVENTOR.
Lawrence Boylan
BY
Robt. W. Pearson
ATTORNEY.

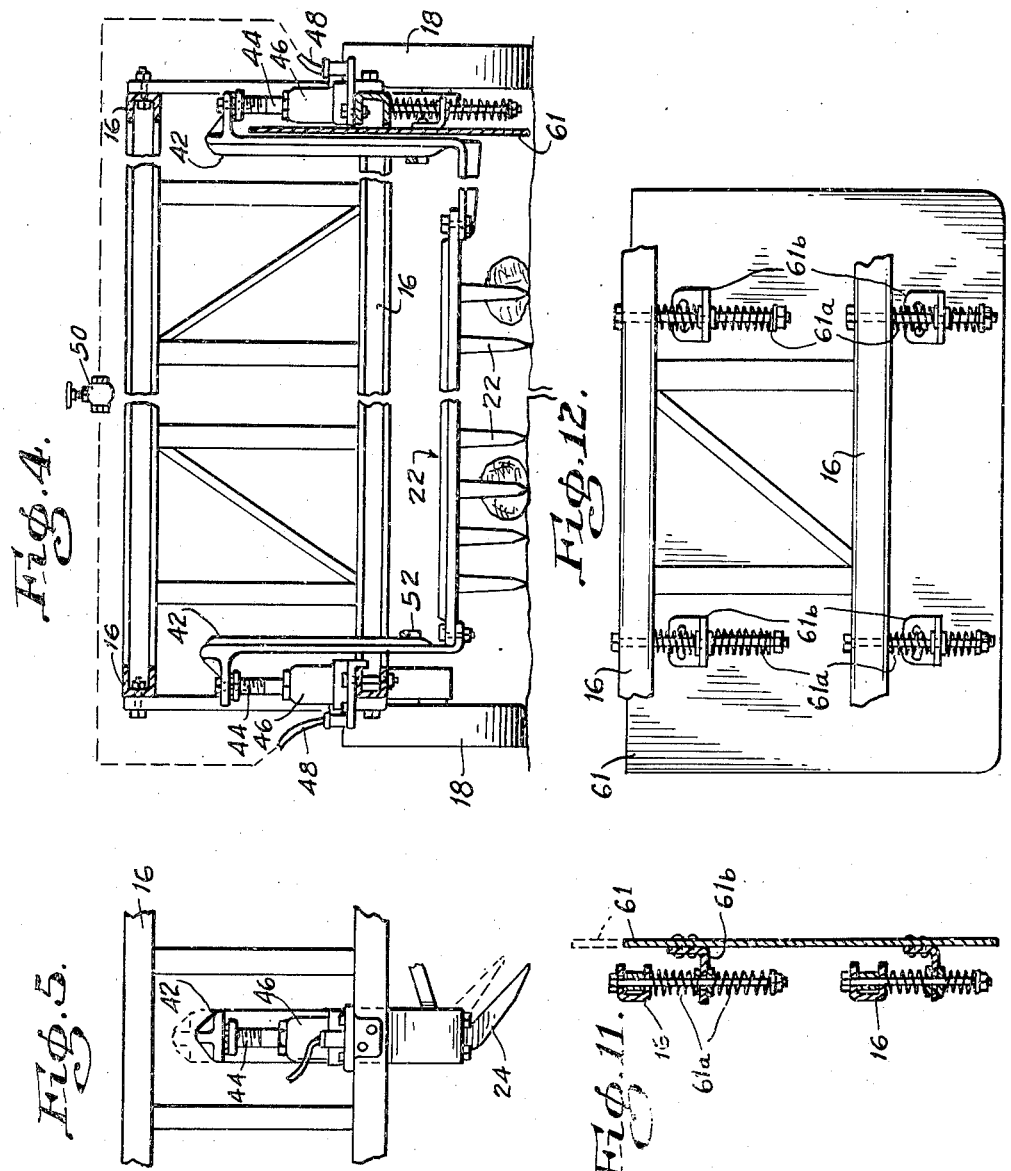

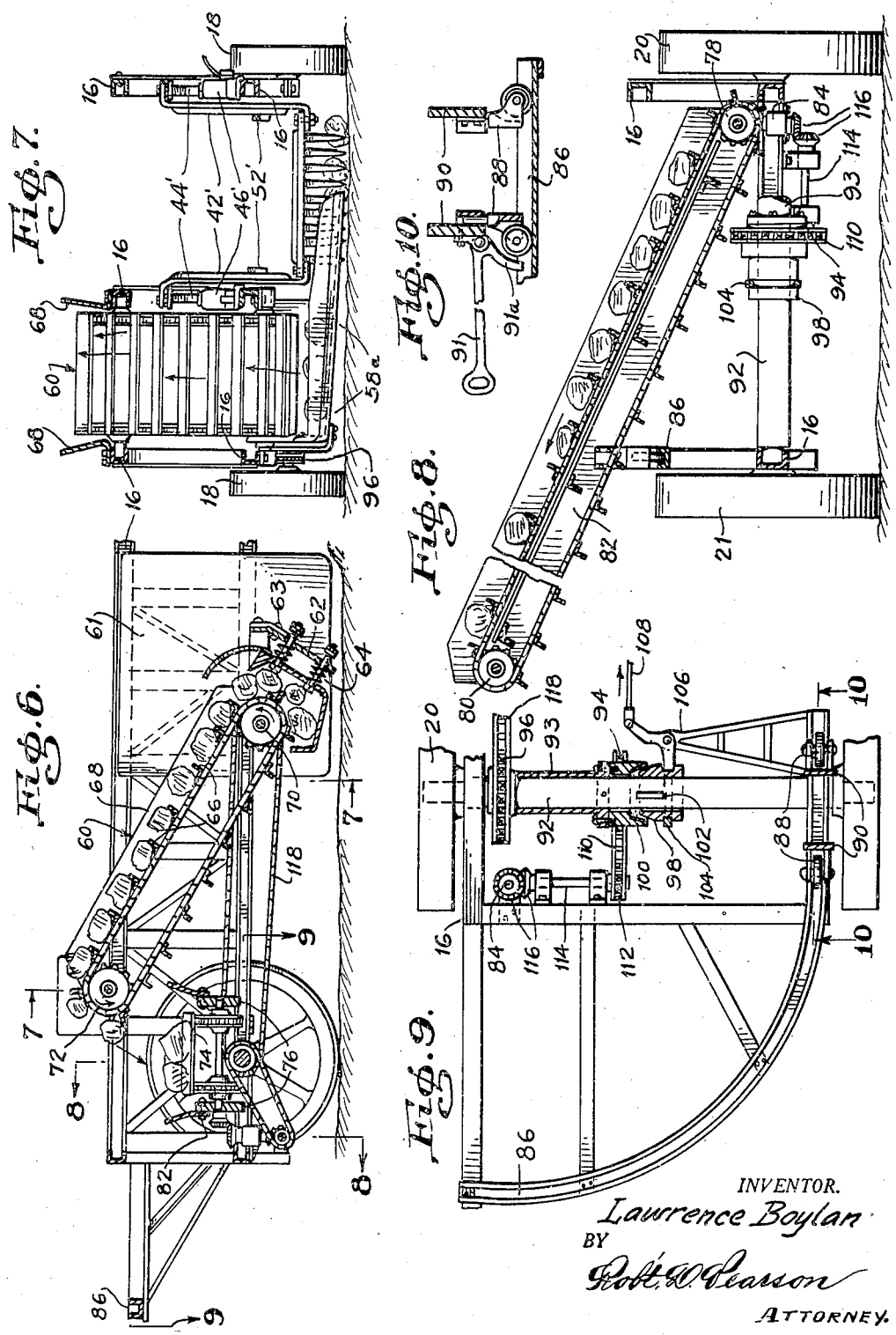

Patented Aug. 23, 1949

2,479,719

UNITED STATES PATENT OFFICE 2,479,719

ROCK PICKING MACHINE

Lawrence Boylan, Grants Pass, Oreg.

Application January 2, 1948, Serial No. 23

2 Claims. (Cl. 55—17)

My invention relates to a clearing machine and is particularly designed to clear off stones lying on or embedded in the surface of the ground to prepare it for cultivation or for other purposes.

In many areas the surface of the ground is thickly strewn with stones of various sizes and the work of clearing away the stones, loose roots and other loose rubbish is quite heavy work since although the individual size of the stones and rubbish may not be large their number necessitates the removal of heavy loads and many trips by several groups of men who are necessary to load the trucks. It will be evident also that the constant stooping of the men to free the stones and then straightening up to throw the rock by hand is very tiring and cannot be long continued without spells for rest.

It is a principal object of my invention to provide a vehicular machine by which the work of freeing the stones from the ground and dumping them in a receptable, which may be a truck, is mechanically effected so that the only manual labor is that involved in driving the machine over the ground to be cleared and in driving the trucks into which the rocks are dumped to and from the scene of operations.

It is a further object of my invention to provide a ground clearing machine fitted with stationary racks effective to dislodge stones lying on and embedded in the surface of the ground and arranged to feed the dislodged stones to moving belt type or other driven conveyor means operating to dump the stones in a receptacle.

Still another object of the invention is to provide a ground clearing machine having stone dislodging rakes delivering the stones to travelling conveyor means driven from a wheel axle of the machine.

Yet another object of the invention is to provide a stone gathering machine having conveyor means extending beyond the frame of the machine to dump the stones into a truck or wheeled receptacle moved along with the machine.

A further object of the invention is to provide a stone gathering machine provided with a travelling type conveyor projecting beyond the frame of the machine, the conveyor being swingable through an arc so that while in normal operation stones may be dumped to one side of the conveyor the latter may if desired be swung into line to the rear of the machine without interrupting the operation of the drive for the conveyor.

Still further features and objects of the invention will appear from the following description taken in conjunction with the accompanying drawings illustrating an embodiment of the invention at present preferred by me but it is to be understood that various changes in and rearrangement of parts may be made by those skilled in the art without departing from the scope of the invention as intended to be defined by the appended claims.

In the drawings:

Fig. 1 is a plan view of the assembled machine of my invention.

Fig. 2 is a detail cross sectional view on line 2—2 of Fig. 1 of a special form of scraper tooth used in the material gathering elements of the machine.

Fig. 3 is a perspective view showing a number of scraper teeth mounted in a scraper member.

Fig. 4 is a cross section taken on line 4—4 of Fig. 1.

Fig. 5 is a fragmentary detail showing the character of adjustment provided for stone collecting rakes fitted in my machine.

Fig. 6 is a cross section on the line 6—6 of Fig. 1.

Fig. 7 is a cross section on the line 7—7 of Fig. 6.

Fig. 8 is a cross section on the line 8—8 of Fig. 6.

Fig. 9 is a cross section on the line 9—9 of Fig. 6.

Fig. 10 is a cross section on the line 10—10 of Fig. 9.

Fig. 11 is an enlarged elevation of the side plate for directing rocks from the first to the second rake.

Fig. 12 is a cross section of Fig. 11 taken at the connection of the plate and its resilient supports.

In the drawings numeral 10 indicates the machine arranged as a trailer which may be hauled over the ground by a tractor vehicle such as shown at 12 but it is to be understood that the machine may be provided with its own propelling and operating power if preferred, but as shown in the drawings the machine is arranged to be operated by drive means rotated by the back wheels and indicated at 14 (Fig. 6). The machine comprises a frame 16 of sturdy construction provided with front wheels 18 and rear wheels 20 and 21. In actual practice the front wheels would be arranged with a wide steering angle to enable the vehicle to make sharp turns but this feature, being understood in agricultural and constructional machines is not illustrated.

On the frame 16 toward its forward end is mounted a diagonally arranged front rake 22 with the tips of its teeth 24 adjustably positioned with respect to the ground by means later described.

The teeth 24 are advantageously formed with a relatively sharp point and thickened butt portion 26 recessed to receive a nut 28 and hold it against turning movement. The teeth 24 are adjustably mounted in an obliquely arranged rake bar 30 provided on its underside with a plurality of sockets or a single channel 32 shaped to receive the butt ends of the teeth and hold them against any turning movement. The teeth are held in the sockets 32 or channel 32 by means of square headed bolts 34 passed through holes drilled through the rake bar 30 and holes drilled through the butts of the rake teeth and engaged in the nuts 28. Preferably I provide a bolt head lock plate 36 provided with a channel 38 which is a snug fit over the square heads of bolts 34 when the latter have been aligned. The plate 36 is itself secured to the top of the rake bar 30 by means of studs 40.

The teeth 24 are preferably formed to project sharply forward of their butt ends to exert a strong gigging up or unearthing action on rocks embedded or lying loose on the top soil.

It will be noted that, with the described arrangement of the rake teeth in the rake bar, the setting of the teeth in the bar cannot become slackened however violent the shocks and vibration to which the rack bar and teeth are subjected, since no relative movement of the parts can occur.

The spacing of the teeth may be varied by removing the plate 36 and extracting the bolts 34 and positioning the teeth in the channel 32 so that the holes through the butts align with the holes through the bar 30 at the desired spacing, and then securing them in position. In order to adjust the height of the teeth I have shown the ends of the rake bar secured to the lower ends of vertical standards 42 the upper ends of which are carried on the plungers 44 of hydraulic rams 46 mounted on the frame of the machine, hydraulic fluid being supplied under the plungers by pipes 48 and manually controlled valve 50 from a pump (not shown). Fig. 5 shows the direction of movement of the rack teeth with adjustment of the hydraulic rams. Radius rods 52 are indicated and arranged to take the drag on the rake bar, the ends of the rods 52 may be secured pivotally between the vertical standards and the frame 16 forward of the rack. It will be noted that at the rearward end of the rake a space indicated at 54 is provided so that rocks collected by the front rake 22 and working along the rearwardly inclined rake will pass through the space 54.

Arranged behind the front rake 22 a back rake 56 is arranged to engage the rocks passing through space 54. The rake 54 may be mounted and arranged in all respects similarly to rake 22 except that it is sloped diagonally across the frame of the machine in the opposite direction to the latter rake 22, for this reason the parts are mounted and adjusted similarly and have been indicated by similar numerals with a prime added as for the front rake; the rocks worked across the back rake teeth are delivered to the lower end of a scoop 58 which is sloped slightly upward so that as the rocks reach end 58a they are caught by an upwardly inclined front conveyor belt 60. A side plate 61 is arranged to prevent rocks from being thrown out of the way of the back rake and is adjustably mounted under resilient tension by double acting springs 61a engaged between the frame 16 and brackets 61b secured to the plate 61.

The scoop 58 is adjustably mounted on the machine frame as shown in Fig. 6 to ensure proper cooperation of the scoop and lower end of belt and to prevent jamming of the rocks at this point. The mounting means comprise a bracket 62 carried on the side frame of the machine and bolts 63 extending through the forward vertical side of the scoop. Helical springs 64 are arranged between the bracket and the side of the scoop, by the desired construction the end of the scoop aligned with conveyor belt 60 may give when necessary to allow rocks of unusally large size or two or more rocks caught between the angle iron lifts 66 of the conveyor to be carried between the end of the belt and the upturned edge of the scoop. The sides 68 are suitably mounted to extend along the upper lift of the conveyor to prevent the rocks being carried upwardly thereon from being jolted off. The front belt conveyor 60 is mounted on lower sprockets 70 and the upper sprockets 72. The belt conveyor is driven by means later described.

It is to be understood that I may prefer to arrange suitable transfer means to raise the rocks from the upper end of the scoop onto the belt 60 if found desirable.

Rocks reaching the upper end of conveyor belt 60 are dropped onto a laterally extending conveyor belt 74 which is sloped upward, from which they may be delivered into a vehicle 75 or any suitable container for conveyance to a dump or other point. The conveyor 74 is mounted on inner sprockets 78 and outer sprockets 80 carried on a frame 82 carrying sides 76 and arranged for swinging movement about a vertical tubular pivot 84. A track 86 in the form of a quadrant is arranged to support the frame 82 for movement from a position variable between a point extending laterally from one side of the frame 16 and extending in line to the rear of the frame. The track 86 may be formed from a length of channel material forming a runway for castors 88 carried in upright 90 connected to the frame 82. Any suitable locking means to hold the frame in adjusted position on the track may be provided, as for instance a lever 91 pivoted on a frame 82 and having a detent 91a adapted to engage in notches cut in the upstanding wall of the track 86. Both conveyor belts are driven from the line axle 92 of the rear wheels of the machine.

A sleeve 93 is mounted on the live axle and a driving sprocket 94 for the laterally extending conveyor 74 and a driving sprocket 96 for the front conveyor belt 60 are secured to a sleeve 92. The driven member 98 of a cone clutch is also secured to the sleeve 93 while the driving member 100 of the clutch is slidably mounted on the axle 99 by means of a key 102 engaging in a keyway in the member 100. The driving member of the clutch is slidable into and out of engagement by means of a clutch engaging fork 104 pivoted on a bracket 106 mounted on the frame 16 and operated by a push-pull rod 108 operable from the front of the machine. The drive is transmitted through a chain 110, driven sprocket 112, shaft 114, bevel gears 116 mounted on the shaft 114 and vertical shaft 117 carried within the tubular pivot 84 and a bevel gear at the upper end of shaft 117 engaging with and driving the inner sprocket 78 of the conveyor 74.

The drive for the front conveyor belt 60 is transmitted from sprocket 96 by the driving chain 118 to a driving sprocket (not shown) mounted on the shaft of sprocket 70.

It will be evident that I have provided a rugged and simply constructed rock gathering machine capable of withstanding the heavy work

I claim:

1. A ground clearing machine comprising: a vehicular frame; means for moving said vehicular frame over the surface of the ground; a front rake diagonally mounted on said vehicular frame so that the teeth of the rake at the forward end engage with the ground ahead of the teeth at the rearward end; and a second rake diagonally mounted on the frame and staggered with respect to the front rake so that the teeth at the forward end thereof engage the rocks passing off the rearward end of the front rake; conveyor means receiving the rocks passing off the rearward end of the second end and conveying them to a receptacle; and means carried by the frame effective to operate said conveyor means, and in addition comprising, a plate positioned to extend vertically in the direction of the vehicular frame and spaced from the rearward end of the front rake but adjacent the forward end of the second rake, and resilient means adjustably mounting said plate on the frame in contact with the ground in position to ensure that rocks passing off the rearward end of the front rake are engaged by the forward end of the second rake.

2. A ground clearing machine comprising; a vehicular frame; means for moving said vehicular frame over the surface of the ground; a front rake diagonally mounted on said vehicular frame so that the teeth of the rake at the forward end engage with the ground ahead of the teeth at the rearward end; and a second rake diagonally mounted on the frame and staggered with respect to the front rake so that the teeth at the forward end thereof engage the rocks passing off the rearward end of the front rake; conveyor means receiving the rocks passing off the rearward end of the second rake and conveying them to a receptacle; a scoop member mounted on the frame and positioned to receive rocks passing off the rearward end of the second rake and effective to guide said rocks into engagement with said conveyor means; and means carried by the vehicular frame effective to operate said conveyor means, and in addition comprising a member positioned to receive rocks dislodged from the ground and move them into position to be acted on by the conveyor means, and resilient members adjustably mounting said member on the vehicular frame to prevent rocks becoming jammed therein.

LAWRENCE BOYLAN.

REFERENCES CITED

The following references are of record in the file of this patent:

UNITED STATES PATENTS

| Number | Name | Date |
|---|---|---|
| 1,304,156 | Chase et al. | May 20, 1919 |
| 1,406,063 | Nagy | Feb. 7, 1922 |
| 1,554,376 | Schrag | Sept. 22, 1925 |
| 1,593,952 | Ribbans | July 27, 1926 |
| 1,713,952 | Darr | May 21, 1929 |

FOREIGN PATENTS

| Number | Country | Date |
|---|---|---|
| 4,326/26 | Australia | Oct. 18, 1927 |